E. S. WINCHESTER.
Steam-Engines.
No. 152,541.          Patented June 30, 1874.
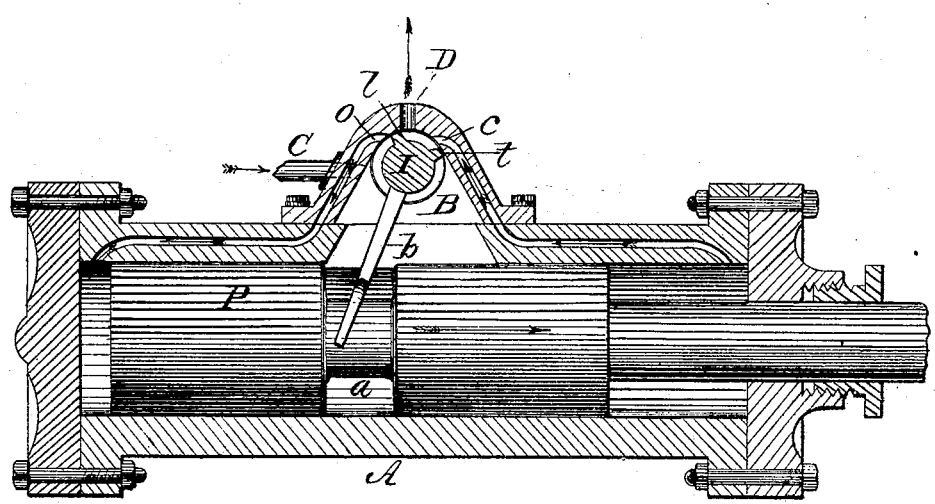
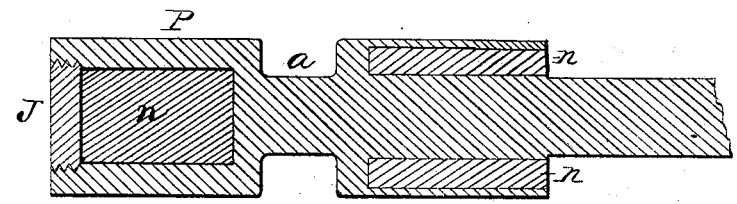
Witnesses:      Fig. 4.      Inventor.
H. H. Dodge            E. S. Winchester.
Jos. C. Wildman    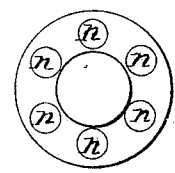    by Dodge & Son
                                      Attys.

UNITED STATES PATENT OFFICE.

EDWARD S. WINCHESTER, OF BOSTON, MASSACHUSETTS.

IMPROVEMENT IN STEAM-ENGINES.

Specification forming part of Letters Patent No. 152,541, dated June 30, 1874; application filed May 20, 1874.

*To all whom it may concern:*

Be it known that I, EDWARD S. WINCHESTER, of Boston, in the county of Suffolk and State of Massachusetts, have invented certain Improvements in Steam-Engines, of which the following is a specification:

My invention consists, first, in a novel construction and arrangement of the valve and ports of a steam or air engine, whereby the valve is operated by direct contact of the piston, and the steam or air is introduced under instead of over the valve, or between the valve and the piston; and, second, it consists, of a piston having a long bearing-surface, and having portions of the metal body cut away and replaced by wood, in order to lighten it, all as hereinafter set forth.

Figure 1 is a longitudinal section of the cylinder, showing the valve, steam-passages, and ports, with the piston in elevation. Fig. 2 is a longitudinal section, and Fig. 3 an end view, of the piston.

In constructing an engine on my plan I make the cylinder with an opening centrally on one side, and over that I form a steam-chamber, B, which may be cast complete, or formed by bolting on a cap, as represented in Fig. 1. The steam-passages, as shown in the drawing, extend from near the ends of the cylinder, and terminate in ports $c$ and $o$ on the inner walls of the chamber B, near its apex, one on each side, this portion of the chamber being formed on its inner face on the arc of a circle, and made true and smooth. Within the chamber B, I pivot an oscillating valve, I, which is provided with two radial wings, $l$ and $t$, as represented in Fig. 1, these wings constituting the valves proper to close and open the ports $c$ and $o$. From the valve I a lever, $b$, extends inward through the opening in the cylinder to near its center, where it rests loosely in a recess or groove extending around the piston P at its center, and by which the valve is operated by the movement of the piston. The steam or air is admitted to the chamber B through a pipe, C, which may enter the chamber at any point underneath the valve, or between it and the piston, and escapes through a hole, D.

In this class of engines, when used for drilling in mines or tunnels, and similar places under ground, they are often operated by compressed air instead of steam; and, as heretofore constructed, much difficulty has arisen from the formation of ice in or about the pipes or passages through which the air escapes after having performed its work, in consequence of its sudden expansion on being liberated, and its absorption of heat from surrounding objects, in accordance with well-known laws.

It will be observed that, by the arrangement of valve and exit port shown in Fig. 1, the air escapes from the valve-chest, when liberated, by simply passing out through the hole D, no pipe or passage being used beyond this hole, and thus I obviate this difficulty.

By keeping the central space around the piston filled with live steam or air, there will be no escape of steam or air from the ends of the piston along into the central space, the pressure at the center being the same as at the end of the cylinder into which the steam or air is admitted.

The manner in which this part of my invention operates is as follows: As represented in Fig. 1, the piston has completed its stroke in one direction, and in so doing it shifted the valve to the position indicated, whereby the live steam or air is admitted from chamber B through the port $o$ into the cylinder behind the piston, to force it back, the wing $t$ at the same time passing the mouth of the port $c$, thus shutting off communication between this port and the live steam or air in chamber B, and permitting the steam at the front end of the piston to pass through port $c$ into the space between the wings $t$ and $l$, and thence out through the hole D, as indicated by the arrows. When the piston has moved a certain distance it shifts the valve, thereby reversing the flow of the steam through the ports, and thus the operation is made continuous.

The distance that the piston moves before operating the valve depends upon the width of the groove $a$, or, in other words, upon the amount of lost motion between the piston and the valve-lever $b$, and which, by means of any adjustable device attached to the end of the lever, may be varied at will, if such variation be desired.

In pistons of this kind, which are made unusually long, in order to afford a large bearing-surface to prevent rapid wear, it is apparent that if the piston were made solid it would be very heavy.

To remedy this I bore a series of holes longitudinally into it from the ends, and then fill these holes with wooden plugs n, as shown in the right-hand end of Fig. 2 and in Fig. 3; or the piston may be made with a single cavity, which, after being filled with wood, may have a screw-cap, J, fitted therein, as shown in Fig. 2. By filling the holes with wood, the accumulation of fluid therein is prevented, which would otherwise occur by condensation were the piston simply left hollow. In this way I make a piston which has a long bearing, and yet is not excessively heavy.

This form of engine is especially adapted for rock-drills and similar machines, though it may be used for other purposes.

Having thus described my invention, what I claim is—

1. The semi-rotating or oscillating valve I, provided with the stem b, in combination with the ports o c and piston P, constructed to operate substantially as described.

2. The steam chamber or space B, opening directly through the side of the cylinder upon the piston, with the inlet-port or supply-pipe C opening into said space between the valve and the piston, whereby the central space around the piston is kept filled with live steam or air, as set forth.

3. The piston P, having a cavity or cavities formed therein, said cavities being filled with wooden plugs n, substantially as shown and described.

EDWARD S. WINCHESTER.

Witnesses:
 EDW. G. HIGHT,
 W. H. WELCH.